United States Patent [19]

Curnes

[11] 4,266,923
[45] May 12, 1981

[54] MEANS OF SUPPORT FOR THE ROLLERS OF A PRESS

[76] Inventor: John J. Curnes, 2127 Irving St., Denver, Colo. 80211

[21] Appl. No.: 123,220

[22] Filed: Feb. 21, 1980

[51] Int. Cl.³ .............................................. A21C 3/02
[52] U.S. Cl. .................................... 425/356; 74/89.2; 425/374
[58] Field of Search ............... 425/356, 374; 74/89.22, 74/89.2

[56] References Cited

U.S. PATENT DOCUMENTS

| 3,572,141 | 3/1971 | Wilkes | 74/89.22 |
| 3,828,615 | 8/1974 | O'Connor | 74/89.22 |
| 3,932,045 | 1/1976 | Hillbery | 74/89.22 |

Primary Examiner—James H. Derrington

[57] ABSTRACT

This invention is the means of support for rollers on a roller type press. This means of support is the configuration of four cables, straps or other suitable material under tension in relation to two rollers and a bed. Rotation is applied to either roller, the cables transfer the rotation to the opposing roller, supply the pressure between the rollers and guide the rollers as a set across the bed. The press can take many forms to provide an economical device, capable of many of the less demanding applications.

5 Claims, 6 Drawing Figures

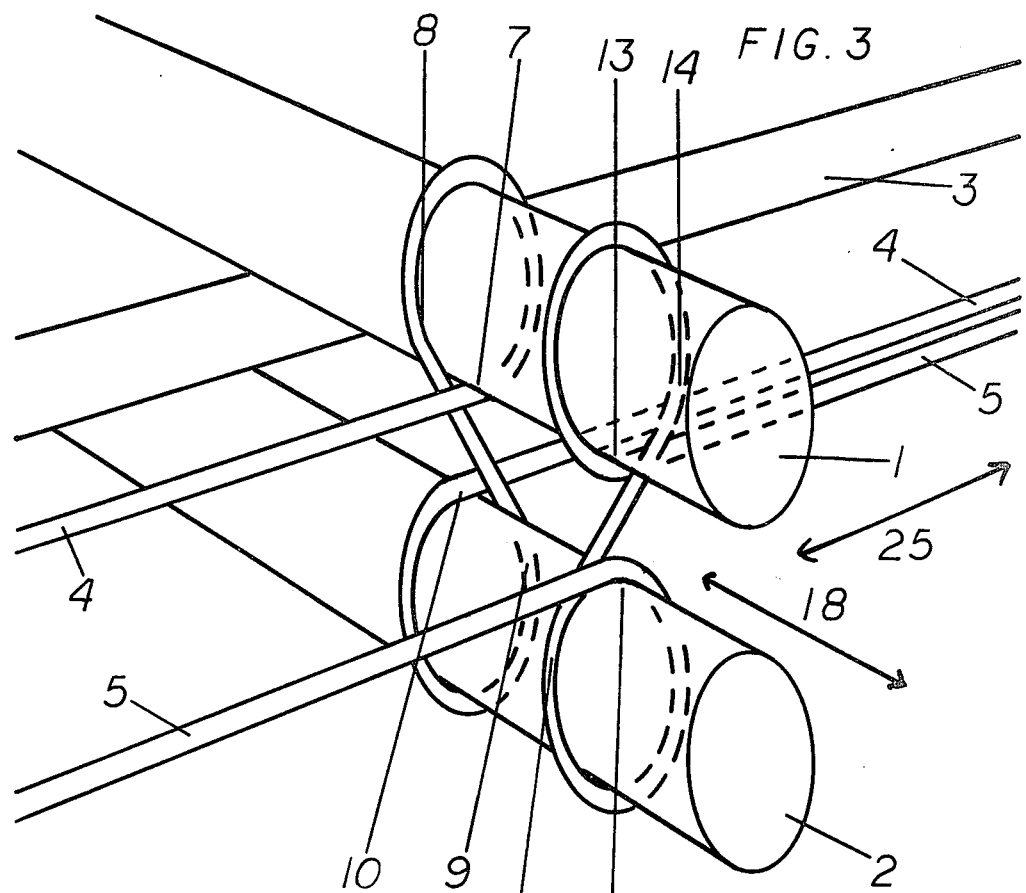
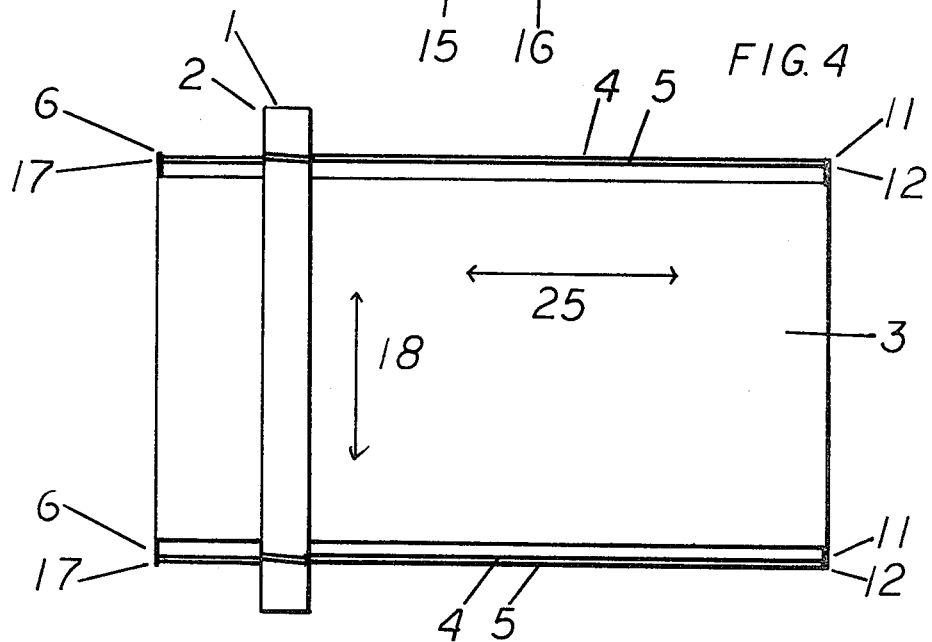

MEANS OF SUPPORT FOR THE ROLLERS OF A PRESS

FIELD OF INVENTION

This invention pertains to the configuration of cables, straps, or other suitable material as a means of supporting and supplying the pressure between and guiding the rollers of a roller press.

DISCUSSION OF PRIOR ART

Prior art of roller press devices has been limited to complex and costly machined devices as in contrast to my design which is simply constructed from common materials with a minimum, if any, machining.

OBJECT OF INVENTION

The object of my invention is to provide an economical device capable of many of the less demanding applications. For example, clay or dough rolling machines.

DESCRIPTION OF DRAWINGS

FIG. 3 illustrates a perspective view of the perferred embodiment of the set of cables as a means of support of rollers of a press.

FIG. 4 is a top view illustrating the lateral movement of the rollers.

DESCRIPTION OF INVENTION

Figure 1:
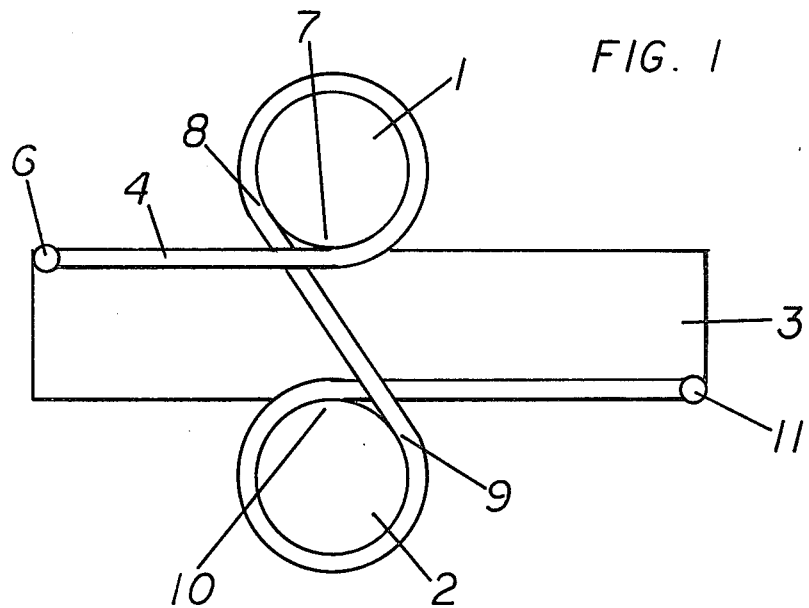
FIG. 1 illustrates the side view configuration of single cable in relation to two rollers on opposing sides of a bed.
Figure 2:
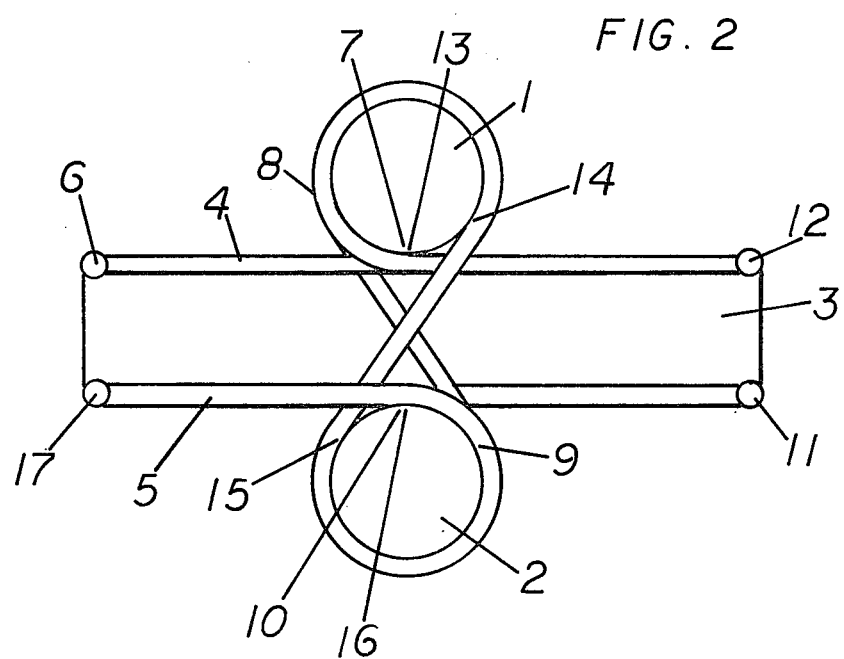
FIG. 2 illustrates the side view of the configuration of two cables in relation to two rollers on opposing sides of a bed forming a set of cables.
Figure 5:
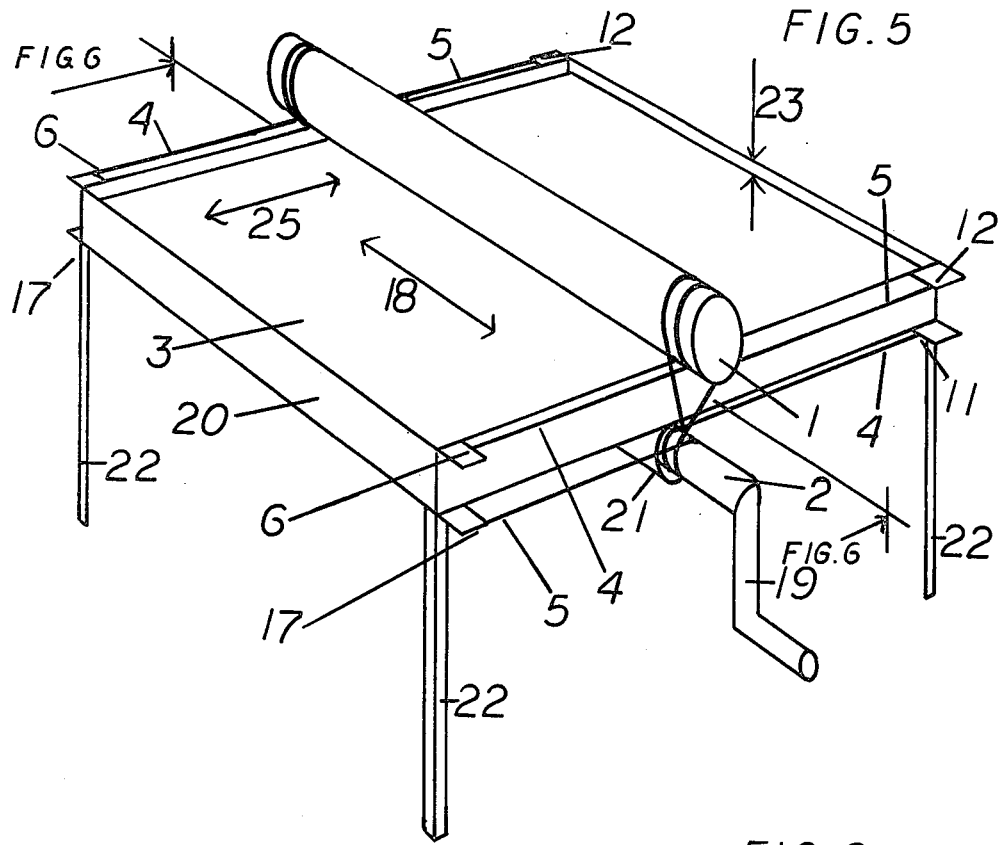
FIG. 5 illustrates a perspective view of a complete roller press using the preferred embodiment of the set of cables to support each end of rollers 1 and 2 with handle 19 on bed 3 supported by frame 20 and legs 22.

The configuration of cables as the means of support for rollers of a press is based on 4 cables, straps, or other suitable material, being in tension in a looped criss-cross configuration so as to support, guide, and supply the pressure between rollers 1 and 2 and enable the rollers to traverse opposing sides of the bed. Roller 1 supplies pressure to the material; roller 2 supports the bed. The cable ends are attached to the bed and attachment varies to the application. For example, it would be stationary for uniform thickness, spring loaded, or counter weighted for irregular surfaces.

Roller 1 and 2 are held in place to bed 3 by cables 4 and 5. Cable 4 is attached by suitable means to point 6 on bed 3, spands to point 7 of roller 1, is in contact with roller 1 to point 8, spands to point 9 of roller 2, is in contact with roller 2 to point 10, spands to point 11 and is attached by suitable means on bed 3, Cable 5 is attached by suitable means to point 12 on bed 3, spands to point 13 on roller 1 is in contact with roller 1 to point 14, spands to point 15 on roller 2, is in contact with roller 2 to point 16, spands to point 17 and is attached by suitable means to bed 3 forming a set of cables in which there is one set of cables at each end of the rollers 1 and 2. Rotation of the rollers is supplied by suitable means to either roller and in the preferred embodiment is supplied by handle 19 to the lower roller 2. The diameter of the rollers and the ratio between the rollers would vary with the application. Depending on the application, a smaller diameter roller may require reinforcement which in the preferred embodiment is supplied by tube 21.

The rollers are of sufficient length to allow for the lateral movement 18 of the rollers due to the uniform winding of the cables on the rollers as the rollers traverse 25 the bed as illustrated in the preferred embodiment in FIG. 4.

The bed is supported by suitable means which in the preferred embodiment is frame 20, that if desired can also act as a spacer 23 for providing a predetermined thickness. The frame is supported by suitable means and in the preferred embodiment by legs 22.

OPERATION

The material being rolled is placed on the bed. Rotation is supplied to one roller by suitable means and in the preferred embodiment is a handle to the lower roller. Rotation is transferred to the opposing roller by the four interlooped cables. The rotation moves the rollers as a unit along the cables to traverse the bed and the material being rolled. The four interlooped cables supply the pressure between the rollers and the material being rolled and the bed. The device works in both directions.

For traversing 25 short distances, the four cables need not wind uniformly as cable binding is not a problem. For extended distances, the four cables must work as a unit as the rollers traverse the bed, in order to reduce cable wear and for ease of operation. FIG. 3 illustrates the preferred embodiment of the configuration of cables as a means of supporting the rollers. The cables remain relatively parallel to the bed and wind uniformly on the rollers and do not bind, thus, causing the rollers to move laterally 18 to the bed as illustrated in FIG. 4.

Figure 6:
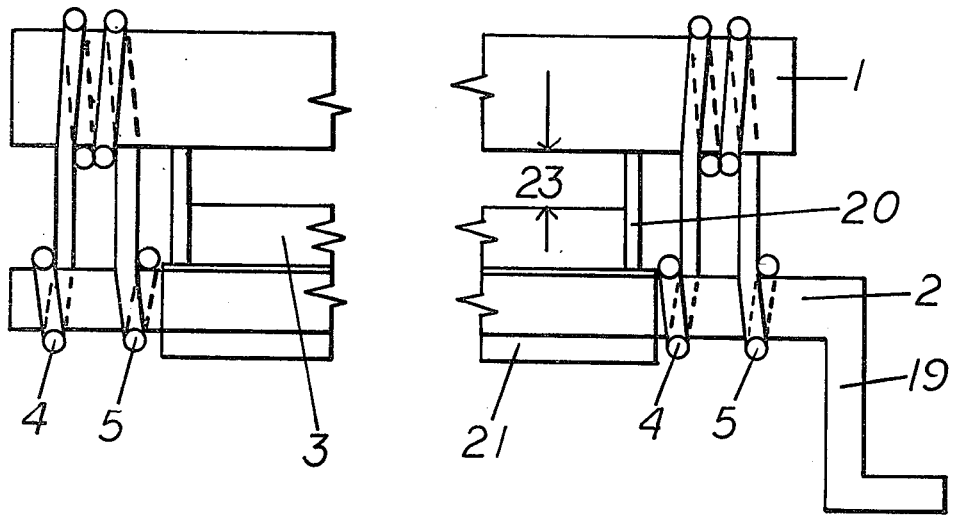
FIG. 6 is a cross sectional view of FIG. 5.

A mechanical advantage is obtainable when the rotation is applied to the rollers that differ in diameter. The torque needed for roller rotation and speed are directly proportional. In the perferred embodiment illustrated in FIG. 6, the mechanical advantage obtains a slower rolling speed with greater torque in rotation and roller movement across the bed. Depending on the application, the smaller roller 2 of the preferred embodiment as illustrated in FIG. 6 may need reinforcement provided by tube 21 to create the stability necessary to support the bed.

While the above description contains many specificaties, these should not be construed as limitations on the scope of the invention, but rather as an exemplification of one preferred embodiment thereof. Many other variations are possible, for example: The rollers, cables, spacer and bed can be varied in size, texture, and proportions to produce the desired effect. Accordingly, the scope of the invention should be determined not by the embodiment illustrated, but by the appended claims and their legal equivalents.

It is claimed:

1. A means of support of rollers for a roller press consisting of a press bed, two rollers and four cables in tension, wherein rotation of a first roller imparts corresponding rotation to a second roller, comprising in combination:

the press bed containing a frame composed of a first side disposed parallel and apart from a second side, and a third side disposed parallel and apart from a fourth side, the combination of sides describing the lateral extremities of the press bed, a first roller laterally disposed and free to roll atop the first side and the second side, a second roller laterally disposed and free to roll underneath the first side and the second side, a first cable affixed atop and adjacent to the intersection of the first side and the third side, then spanning to the bottom of the first roller, then looping around counter clockwise the circumference of the first roller, then spanning to the second roller, then looping clockwise around the circumference of the second roller, then spanning to its extremity where the first cable is affixed at the bottom and adjacent to the intersection of the first side and the fourth side, a second cable affixed atop and adjacent to the intersection of the first side and the fourth side, then spanning to the bottom of the first roller, then looping around clockwise the circumference of the first roller, then spanning to the second roller, then looping counter clockwise the circumference of the second roller, then spanning to its extremity where the second cable is affixed at the bottom and adjacent to the intersection of the first side and the third side, a third cable affixed atop and adjacent to the intersection of the second side and the third side, then spanning to the bottom of the first roller, then looping around counter clockwise the circumference of the first roller, then spanning to the second roller, then looping clockwise around the circumference of the second roller, then spanning to its extremity where the third cable is affixed at the bottom and adjacent to the intersection of the second side and the fourth side, and a fourth cable affixed atop and adjacent to the intersection of the second side and the fourth side, then spanning to the bottom of the first roller, then looping around clockwise the circumference of the first roller, then spanning to the second roller, then looping counter clockwise the circumference of the second roller, then spanning to its extremity where the fourth cable is affixed at the bottom and adjacent to the intersection of the second side and the third side.

2. The system of claim 1 wherein the diameters of the first roller and the second roller are of different dimensions.

3. The system of claim 1 wherein the diameters of the first roller and the second roller are the same dimension.

4. The system of claim 1 wherein a handle is affixed at a lateral extremity of the second roller.

5. The system of claim 1 wherein the second roller is encased in a tube.

* * * * *